US009438581B2

(12) United States Patent
Nairn

(10) Patent No.: US 9,438,581 B2
(45) Date of Patent: Sep. 6, 2016

(54) AUTHENTICATING DATA AT A MICROCONTROLLER USING MESSAGE AUTHENTICATION CODES

(71) Applicant: GM Global Technology Operations LLC, Detroit, MI (US)

(72) Inventor: David Nairn, Plymouth, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/253,454

(22) Filed: Apr. 15, 2014

(65) Prior Publication Data

US 2015/0295910 A1   Oct. 15, 2015

(51) Int. Cl.
*H04L 29/06* (2006.01)

(52) U.S. Cl.
CPC .............. *H04L 63/08* (2013.01); *H04L 63/123* (2013.01); *H04L 63/126* (2013.01)

(58) Field of Classification Search
CPC ..................................................... H04L 9/3242
See application file for complete search history.

(56) References Cited

U.S. PATENT DOCUMENTS

| | | | |
|---|---|---|---|
| 4,531,826 A * | 7/1985 | Stoughton .............. | G03G 21/02 377/16 |
| 8,226,340 B1 * | 7/2012 | Mahalingam ......... | H04W 12/08 411/411 |
| 2003/0221097 A1 * | 11/2003 | Nakano et al. ............... | 713/150 |
| 2007/0245147 A1 * | 10/2007 | Okeya ........................... | 713/181 |
| 2011/0066756 A1 * | 3/2011 | Kakumaru .......... | H04L 29/1232 709/245 |
| 2012/0210115 A1 * | 8/2012 | Park ...................... | H04L 9/3242 713/2 |

OTHER PUBLICATIONS

Shi, Weidong, et al. "Architectural support for high speed protection of memory integrity and confidentiality in multiprocessor systems. "Proceedings of the 13th International Conference on Parallel Architectures and Compilation Techniques. IEEE Computer Society, 2004.*

* cited by examiner

*Primary Examiner* — Shawnchoy Rahman
(74) *Attorney, Agent, or Firm* — Christopher DeVries; Reising Ethington P.C.

(57) ABSTRACT

A system and method of verifying data at a microcontroller using message authentication codes (MACs) includes generating at a microprocessor of the microcontroller a valid MAC using valid data; transmitting the valid MAC to a peripheral of the microcontroller along with the valid data; receiving an authentication message at the microprocessor from the peripheral in response to transmitting the valid MAC; generating at the microprocessor an invalid MAC, which is created by changing one or more bits of the valid MAC; transmitting the invalid MAC to the peripheral along with the valid data in response to the authentication message; and receiving a second authentication message at the microprocessor from the peripheral in response to transmitting the invalid MAC.

17 Claims, 3 Drawing Sheets

US 9,438,581 B2

AUTHENTICATING DATA AT A MICROCONTROLLER USING MESSAGE AUTHENTICATION CODES

TECHNICAL FIELD

The present invention relates to authenticating data using message authentication codes (MACs) and, more particularly, to authenticating data at a microcontroller that is transmitted between a microprocessor of the microcontroller and a peripheral used by the microprocessor.

BACKGROUND

Microcontrollers are used in a wide variety of applications to execute automated control over different functions. The microcontrollers act as small computers using one or more integrated circuits. Generally speaking, the microcontrollers can include one or more microcontroller elements, such as microprocessors, memory devices, busses, or peripheral devices. Using these elements, the microcontrollers can direct the function of mechanical, electrical, or electromechanical devices. In one example, the body control module of a vehicle can be implemented using a microcontroller.

To function properly, the microcontroller elements rely on the data they exchange. However, sometimes the data exchanged between the microcontroller elements becomes corrupt and therefore unreliable. It would be helpful to implement a feature at a microcontroller that would detect when a peripheral of the microcontroller is providing invalid data and direct internal sight of the peripheral process is purposely not possible (by design).

SUMMARY

According to an embodiment of the invention, there is provided a method of verifying data at a microcontroller using message authentication codes (MACs). The method includes generating at a microprocessor of the microcontroller a valid message authentication code (MAC) using valid data; transmitting the valid MAC to a peripheral of the microcontroller along with the valid data; receiving an authentication message at the microprocessor from the peripheral in response to transmitting the valid MAC; generating at the microprocessor an invalid MAC, which is created by changing one or more bits of the valid MAC; transmitting the invalid MAC to the peripheral along with the valid data in response to the authentication message; and receiving a second authentication message at the microprocessor from the peripheral in response to transmitting the invalid MAC.

According to an embodiment of the invention, there is provided a system of verifying data at a microcontroller using message authentication codes (MACs). The system includes a microprocessor and a peripheral of the microcontroller communicatively connected via a bus, wherein the microprocessor transmits a valid message authentication code (MAC) that has been created using valid data to the peripheral along with the valid data; receives an authentication message from the peripheral in response to transmitting the valid MAC; transmits an invalid MAC along with the valid data to the peripheral; and receives a second authentication message from the peripheral in response to transmitting the invalid MAC.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

Figure 1:
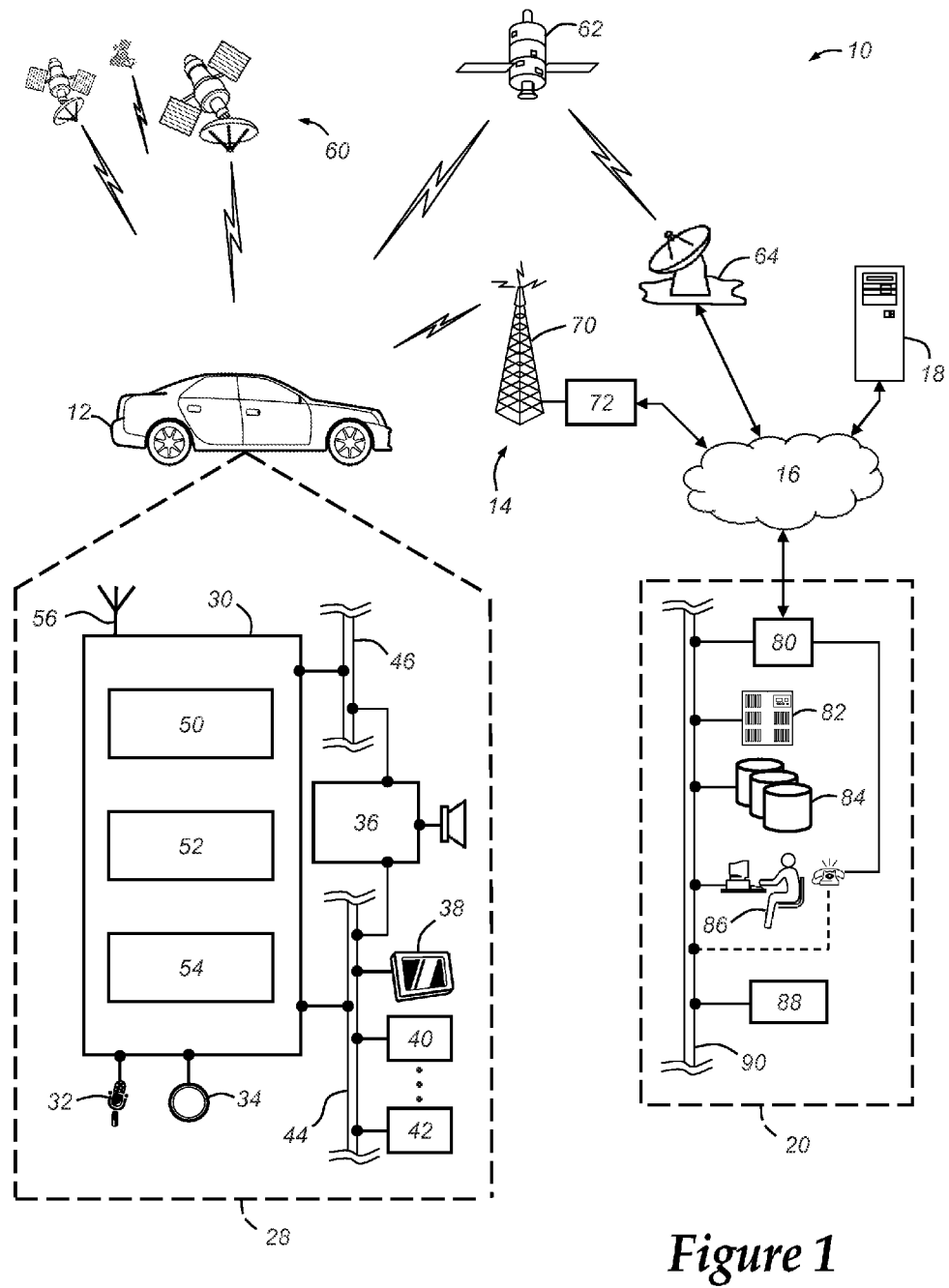
FIG. 1 is a block diagram depicting an embodiment of a communications system that is capable of utilizing the method disclosed herein.

The system and method described below uses message authentication codes (MACs) within a microcontroller to determine whether communicated data is valid. Microcontrollers often include microcontroller elements that protect against the degradation of data. However, the microcontrollers can include other microprocessor elements that do not include these verification features. For example, the microprocessor used by the microcontroller can implement a multi-core design and/or error correction codes (ECC) that can inherently verify data stored/generated/processed within the microcontroller. But the microprocessor may communicate with a peripheral device having its own microprocessor that does not use verification features. Thus, the microcontroller can verify its peripheral responsible for MAC verification is correctly functioning by exchanging MACs which are controlled.

MACs can be used to authenticate data or messages communicated between two electronic devices, such as the microprocessor and the peripheral device. To ensure that the data transmitted from a peripheral to the microprocessor is authentic, a MAC can be generated by the microprocessor using a MAC algorithm, which is a function of the data to be sent, and a secret key. Example MAC algorithms include HMAC, a hash function-based message authentication algorithm, and CMAC, a block cipher-based message authentication algorithm.

When used to authenticate communications between the microprocessor and the peripheral, the generated MAC can be sent to the peripheral along with the data used to create that MAC. The peripheral has its own copy of the secret key and MAC algorithm, which the peripheral can use to calculate a comparison MAC using the received data, its own copy of the secret key, and the MAC algorithm. When the comparison MAC calculated by the peripheral matches the MAC it was sent, the peripheral can determine that the data is authentic and output a "yes" answer confirming this. In contrast, when the comparison MAC calculated by the receiving ECU does not match the MAC received, a "no" answer can be output. In this sense, the peripheral outputs a binary "yes" or "no" response to whether or not the comparison MAC matches the received MAC. The process of determining if the MAC of a message is correct and outputting a binary "yes" or "no" response can be referred to as MAC verification.

To verify the internal processing of the peripheral is free of errors, the microprocessor can query the peripheral device using valid or known data, a valid MAC that has been calculated using the valid data, a MAC algorithm, and the secret key, and an invalid MAC derived from the valid MAC. The microprocessor can send the valid MAC to the peripheral with the valid data used to create the valid MAC. The peripheral can use its own microprocessor, the MAC algorithm, and the secret key to calculate the comparison MAC and determine whether the comparison MAC matches the valid MAC. The peripheral should output a binary "yes" that the valid MAC matches the comparison MAC. But sometimes the peripheral outputs a binary "yes" regardless of whether the MAC calculated by the peripheral matches the MAC received. In those cases, the peripheral outputting the binary output representing "yes" may be unable to reset itself and outputs "yes" regardless of the validity of the MAC received. When this occurs, the microprocessor of the microcontroller may no longer be confident that the data it receives from the peripheral is valid.

The microprocessor can create an invalid MAC and transmit the invalid MAC to the peripheral device with the valid data used to create the valid MAC. The invalid MAC can be created by changing one or more bits of the valid MAC. For instance, with respect to a 128 bit MAC, the microprocessor can change the 128th bit of a valid MAC from a binary "zero" to a binary "one" thereby creating an invalid MAC. The invalid MAC can then be sent to the peripheral device along with the valid data used to create the valid MAC. The peripheral device should calculate a comparison MAC using the valid data, compare it to the received invalid MAC, and output a binary "no" that the MAC. But as noted above, if the peripheral outputs a binary "yes," the microprocessor of the microcontroller can determine that the peripheral device is not properly verifying MACs it receives. The system and method described below involves an implementation at a vehicle. However, it should be appreciated that implementations in other environments outside of a vehicle are possible.

Communications System—

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method—

Figure 2:
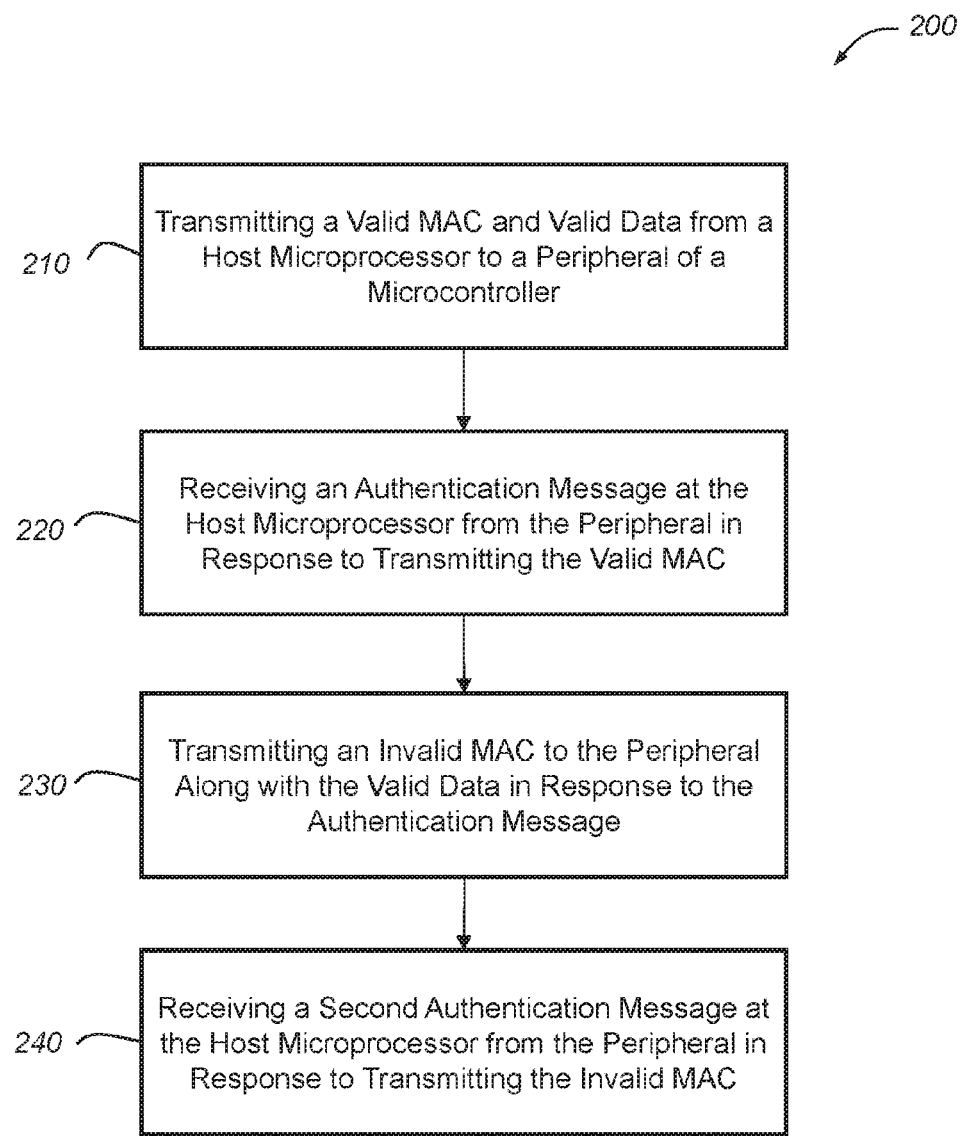
FIG. 2 is a flow chart of a method of verifying data at a microcontroller using message authentication codes (MACs)

Turning now to FIG. 2, there is shown a method 200 of verifying data at a microcontroller using message authentication codes (MACs). The method 200 begins at step 210 by generating at a microprocessor of the microcontroller a valid MAC that has been created using valid data. Both the valid MAC and the valid data can then be transmitted to a peripheral of the microcontroller. The microprocessor of the microcontroller may be also be referred to as a "host microprocessor" in order to avoid confusion with the microprocessor(s) used by the peripheral. As noted above, distinctions exist between the host microprocessor and the microprocessor used by the peripheral. For example, the host microprocessor may be a more sophisticated integrated circuit that employs multiple core processors and error correction code (ECC) to ensure that data processed is without error. In contrast, the microprocessor(s) of the peripheral may not use multiple core processors or ECC thereby lacking the error protections found in the host microprocessor.

The valid MAC can be created from what the host microprocessor knows is valid data. Valid data can be a known string of data stored at the microprocessor. The known string of data can then be used with the secret key and a MAC algorithm at the microprocessor to derive a valid MAC. However, it is also possible to store both the valid data and an previously-derived valid MAC at the microprocessor such that the valid MAC can be accessed and sent without deriving it for each transmission. After accessing or generating the valid MAC, the microprocessor can then transmit the valid MAC and the valid data to the peripheral.

The valid MAC can include other instructions as well. For instance, the valid MAC can be truncated by the host microprocessor and include a truncated value that instructs the peripheral to create a comparison MAC and compare only the bits specified by the truncated value. In one example, the valid MAC could normally include 128 bits. However, due to size constraints, the valid MAC can be truncated to 30 bits and include a truncated value (in this case 30 bits) reflecting the size of the valid MAC. The method 200 proceeds to step 220.

At step 220, an authentication message is received at the host microprocessor from the peripheral in response to transmitting the valid MAC. Once the peripheral has received the valid MAC and the valid data, it can generate a comparison MAC. The comparison MAC can be generated using a microprocessor at the peripheral that inputs the valid data into an authentication MAC with a copy of the secret key maintained at the peripheral. The peripheral can then determine whether the comparison MAC that it created matches the valid MAC. The comparison MAC and the valid MAC should match and the peripheral can output a logical "yes" as an authentication message indicating this result. The authentication message can then be transmitted to the host microprocessor over a bus. The method 200 proceeds to step 230.

At step 230, the host microprocessor generates an invalid MAC and transmits it to the peripheral along with the valid data in response to the authentication message. The host microprocessor can then verify that the peripheral can output a logical "no" indicating that the invalid MAC is incorrect. The invalid MAC can be created by modifying one or more bits of the valid MAC. For example, in a system that uses 128 bit MACs, the host microprocessor can create the invalid MAC by changing the 128th bit of the valid MAC (from a logical "0" to "1" or vice versa). This can help identify whether or not the peripheral reads each bit of the MACs it receives. It can also help identify when the peripheral outputs a logical "yes" regardless of the data or MAC it receives. And like the valid MAC, it can stored at the microprocessor such that "generating" it involves accessing it from a stored location.

The invalid MAC can also be generated as a truncated MAC. In one illustrative example, instead of the 128 bit MAC, the valid and/or invalid MACs can include a truncated value representing the number of bits of a shortened valid MAC or invalid MAC. When truncated MACs are used, the valid MAC can be truncated to shorter length (e.g., 30 bits rather than 128 bits) and the truncated value will be set to the value representing the shorter length. When creating the invalid MAC from the valid MAC, the 30th bit of a truncated valid MAC can be changed and sent to the peripheral along with the truncated value set to thirty. When the truncated invalid MAC is received by the peripheral it can read the truncated value and determine that it should generate a comparison MAC that is, in this example, thirty bits long. The peripheral can also be instructed to use the most significant bits or the least significant bits. The method 200 proceeds to step 240.

At step 240, a second authentication message is received at the host microprocessor from the peripheral in response to transmitting the invalid MAC. When the peripheral is operating normally, it should output a logical "no" when comparing the invalid MAC to the comparison MAC it generates from the MAC algorithm using the valid data and the secret key. The peripheral, when properly operating, can receive the invalid MAC and the valid data, create a comparison MAC using the valid data, and compare the invalid MAC with the comparison MAC generated using the valid data. The peripheral will determine that the 128th bit does not match and output a logical "no." When the host microprocessor receives the logical "no" from the peripheral, the microprocessor can determine that the peripheral is properly authenticating MACs. But when the host microprocessor receives a logical "yes" from the peripheral, the microprocessor can determine that some malfunction is occurring at the peripheral. As discussed above, the peripheral could be unable to reset the logical result it outputs when comparing the received MACs with comparison MACs or the peripheral may not be processing each bit of the received MACs. In one implementation, this can cause the microcontroller to generate one or more warning codes and communicate them to a location outside of the microcontroller, such as the VSM 42 sending diagnostic trouble codes (DTCs) to a vehicle telematics unit 30, in response to receiving a logical "yes"

The host microprocessor may send additional invalid MACs to the peripheral in response to the second authentication message in an effort to identify which bit of the comparison MAC that does not match the invalid MAC. This can be carried out by constructing one or more invalid MACs by changing different bits of the valid MAC. The invalid MACs can then be sent until a logical "no" is output by the peripheral. For instance, using the example above of a 128 bit invalid MAC, the host microprocessor sent a first invalid MAC by changing the 128th bit. The host microprocessor can generate an additional invalid MAC that returns the 128th bit to a valid value and then makes the 127th bit invalid. The additional invalid MAC can then be sent to the peripheral and a logical response can be received. It is possible to repeat this process for the remaining 126 bits to determine if the logical output from the peripheral changes at any of the bits. The method 200 then ends.

Figure 3:
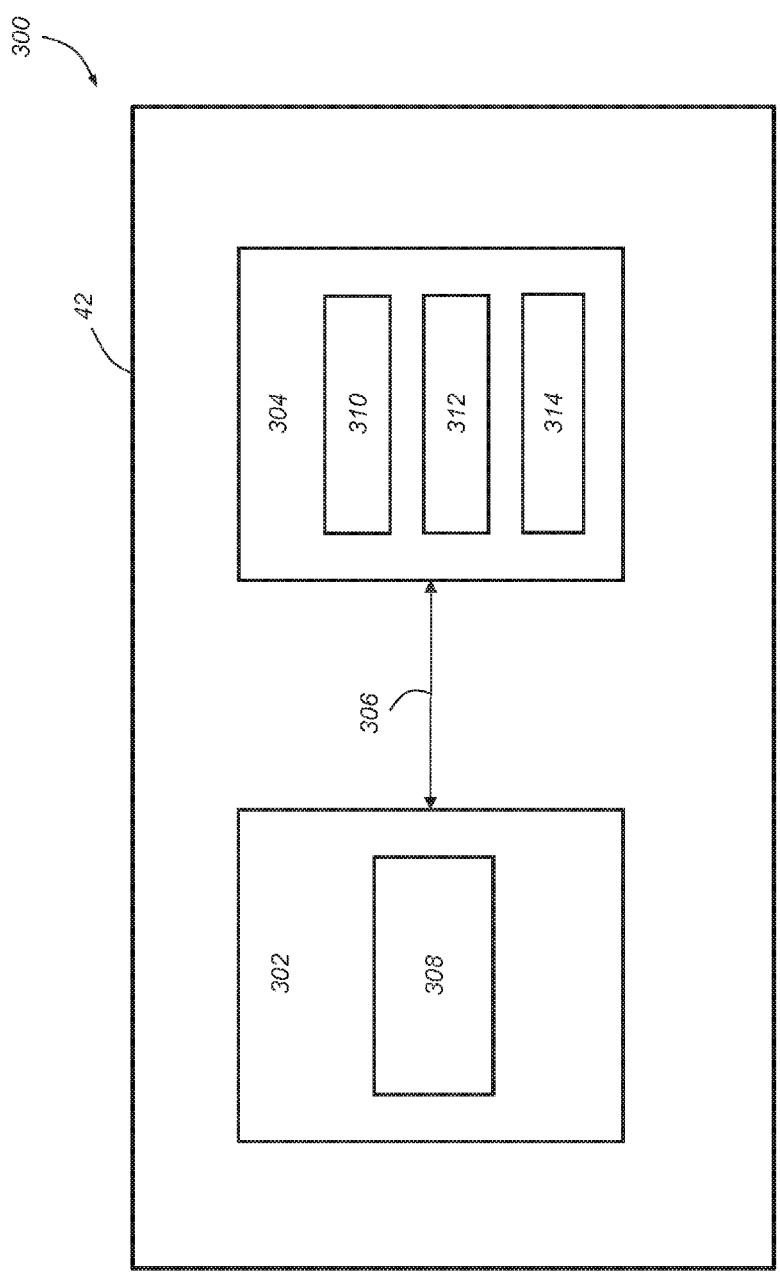
FIG. 3 is a block diagram depicting an embodiment of a system of verifying data at a microcontroller using MACs.

Turning to FIG. 3, a system 300 of verifying data at a microcontroller using MACs is shown. The system 300 is described with respect to a microcontroller embodied by the vehicle system module VSM 42 described above with respect to FIG. 1. However, it should be appreciated that the system 300 can be applied to microcontrollers used in non-vehicular environments. The VSM 42 includes a host microprocessor 302 linked to a peripheral 304 via a bus 306. In this implementation the host microprocessor 302 uses a dual-core processor and error correction code (ECC). In addition, the host microprocessor 302 includes a host memory device 308 that can store data in the form of computer-readable instructions, one or more secret keys, one or more MAC algorithms, valid MACs, and/or invalid MACs. The bus 306 communicatively links the host microprocessor 302 to the peripheral 304, which includes a peripheral microprocessor 310, a peripheral interface 312, and a peripheral memory device 314 that can be used to store secret keys, and MAC algorithms. One example of the microcontroller used by the VSM 42 is sold by Freescale Technology as model number MPC 560xB.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of verifying data at a microcontroller using message authentication codes (MACs), comprising the steps of:
 (a) generating at a microprocessor of the microcontroller a valid message authentication code (MAC) using valid data;
 (b) transmitting the valid MAC to a peripheral of the microcontroller along with the valid data;
 (c) receiving an authentication message at the microprocessor from the peripheral in response to transmitting the valid MAC;
 (d) generating at the microprocessor an invalid MAC, which is created by changing one or more bits of the valid MAC;

(e) testing the peripheral's MAC verification by transmitting the invalid MAC to the peripheral along with the valid data in response to the authentication message;

(f) receiving a second authentication message at the microprocessor from the peripheral in response to transmitting the invalid MAC;

(g) determining whether the peripheral is properly authenticating MACs based on the second authentication message; and wherein steps (a) and (d) are carried out by the microprocessor in the microcontroller, and wherein in steps (c) and (f) the authentication messages are received by the microprocessor in the microcontroller.

2. The method of claim 1, further comprising the step of storing the valid MAC at the microprocessor.

3. The method of claim 1, further comprising the step of storing the valid data at the microprocessor.

4. The method of claim 1, wherein the microprocessor is a multi-core processor, uses error correction code, or both.

5. The method of claim 1, further comprising the step of generating a comparison MAC at the peripheral.

6. The method of claim 1, further comprising the step of installing the microcontroller in a vehicle.

7. The method of claim 1, further comprising the step of truncating the valid MAC.

8. A system of verifying data at a microcontroller using message authentication codes (MACs), comprising:

a microprocessor and a peripheral of the microcontroller communicatively connected via a bus, wherein the microprocessor is configured to:

transmit a valid message authentication code (MAC) that has been created using valid data to the peripheral along with the valid data;

receive an authentication message from the peripheral in response to transmitting the valid MAC;

test the peripheral's MAC verification by transmitting an invalid MAC along with the valid data to the peripheral; and receive a second authentication message from the peripheral in response to transmitting the invalid MAC; and determine whether the peripheral's MAC verification is malfunctioning based on the second authentication message.

9. The system of claim 8, wherein the valid MAC is stored at the microprocessor.

10. The system of claim 8, wherein the valid data is stored at the microprocessor.

11. The system of claim 8, wherein the microprocessor further comprises a multi-core processor.

12. The system of claim 8, wherein the authentication message from the peripheral is based on a comparison between the valid MAC and a comparison MAC generated by the peripheral using the valid data, and wherein the second authentication message from the peripheral is based on a comparison between the invalid MAC and a comparison MAC generated by the peripheral using the valid data.

13. The system of claim 8, wherein the microcontroller is installed in a vehicle.

14. The system of claim 8, wherein the microprocessor truncates the valid MAC.

15. The method of claim 1, wherein the authentication message from the peripheral is based on a comparison between the valid MAC and a comparison MAC generated by the peripheral using the valid data, and wherein the second authentication message from the peripheral is based on a comparison between the invalid MAC and a comparison MAC generated by the peripheral using the valid data.

16. The method of claim 1, further comprising generating a warning code in response to determining that the peripheral is not properly authenticating MACs.

17. The method of claim 8, wherein the microprocessor is further configured to generate a warning code in response to determining that the peripheral's MAC verification is malfunctioning.

* * * * *